(12) United States Patent
Wright et al.

(10) Patent No.: US 12,024,027 B2
(45) Date of Patent: Jul. 2, 2024

(54) ELECTRO-MECHANICAL CROSS STEER DRIVE DEVICE FOR A VEHICLE

(71) Applicant: Kinetics Drive Solutions, Inc., Langley (CA)

(72) Inventors: Grant Wright, Surrey (CA); Andrew Johnson, Mission (CA); Ron Scheper, Abbotsford (CA)

(73) Assignee: Kinetics Drive Solutions, Inc. (CA)

( * ) Notice: Subject to any disclaimer, the term of this patent is extended or adjusted under 35 U.S.C. 154(b) by 0 days.

(21) Appl. No.: 18/017,909

(22) PCT Filed: Jul. 22, 2021

(86) PCT No.: PCT/CA2021/051024
§ 371 (c)(1),
(2) Date: Jan. 25, 2023

(87) PCT Pub. No.: WO2022/020941
PCT Pub. Date: Feb. 3, 2022

(65) Prior Publication Data
US 2023/0271506 A1    Aug. 31, 2023

Related U.S. Application Data

(60) Provisional application No. 63/057,127, filed on Jul. 27, 2020.

(51) Int. Cl.
*B60K 1/02* (2006.01)
*B60L 15/20* (2006.01)
(Continued)

(52) U.S. Cl.
CPC ............ *B60L 15/2036* (2013.01); *B60K 1/02* (2013.01); *B60L 15/2054* (2013.01);
(Continued)

(58) Field of Classification Search
CPC ............... F16H 37/0806; F16H 48/085; F16H 2048/368; B60K 1/02; B60K 7/0007;
(Continued)

(56) References Cited

U.S. PATENT DOCUMENTS

| 5,445,234 A | 8/1995 | Hall | |
| 8,029,399 B2* | 10/2011 | Thompson | B62D 11/14 475/339 |
| 2008/0210481 A1* | 9/2008 | Boss | B62D 11/04 180/65.7 |

FOREIGN PATENT DOCUMENTS

| CN | 103332109 | 10/2013 |
| CN | 103332109 A * | 10/2013 |

(Continued)

OTHER PUBLICATIONS

English Translation of CN103332109A; http://translationportal.epo.org; Nov. 24, 2023 (Year: 2023).*

(Continued)

*Primary Examiner* — Roger L Pang
(74) *Attorney, Agent, or Firm* — Davis, Malm & D'Agostine, P.C.; Richard L. Sampson

(57) ABSTRACT

According to the present invention there is provided an electro-mechanical cross-steer device for a vehicle. The device may include a first and a second motor and first and second output planetary gear set, each having a transfer gear assembly mechanically connected to the first and second motors, respectively. Additionally, a differential may be included which is mechanically connected to the first and second output planetary gear sets via a mainshaft connected to the first and second output planetary gear sets. First and second input shafts may be mechanically connected to the first and second transfer gear assemblies and to the differential. First and second output shafts may be respectively connected to the first and second output planetary gear sets (Continued)

with each of the output shafts operable to drive a particular side of a vehicle.

10 Claims, 8 Drawing Sheets

(51) Int. Cl.
    *F16H 37/08*     (2006.01)
    *F16H 48/05*     (2012.01)

(52) U.S. Cl.
    CPC ......... *F16H 37/0806* (2013.01); *F16H 48/05* (2013.01); *B60L 2220/42* (2013.01)

(58) Field of Classification Search
    CPC .... B60K 2007/0061; B60K 2007/0092; B60K 17/356; B60L 15/2036; B60L 15/2054; B60L 2200/42
    USPC .......................... 475/5, 18, 28, 29, 221, 225
    See application file for complete search history.

(56) References Cited

FOREIGN PATENT DOCUMENTS

| WO | WO-2008117025 A1 * | 10/2008 | ............ B62D 11/16 |
| WO | 2017198356 A1 | 11/2017 | |

OTHER PUBLICATIONS

Breton, Antione, Authorized Officer ISA/CA; International Search Report and Written Opinion for PCT/CA2021/051024 dated Oct. 26, 2022; Gatineau, Quebec, CA; pp. 1-8.

* cited by examiner

ELECTRO-MECHANICAL CROSS STEER DRIVE DEVICE FOR A VEHICLE

COPYRIGHT NOTICE

This patent document contains material which is subject to copyright protection. The copyright owner has no objection to the facsimile reproduction by anyone of this patent document as it appears in the Patent and Trademark Office patent file or records, but otherwise reserves all copyright rights whatsoever.

FIELD OF THE INVENTION

The invention relates to the field of drive devices useful as a vehicle propulsion system and in particular, a electro-mechanical drive device suitable for use in a wheeled or track laying vehicle supplying main propulsion and steering functions.

BACKGROUND OF THE INVENTION

This application is a national stage application claiming priority to PCT/CA2021/051024 filed Jul. 22, 2021, which claims priority to U.S. Ser. No. 63/057126 filed Jul. 27, 2020.

A drive device suitable for use in a wheeled or track laying vehicle supplying main propulsion and steering functions is provided. Typically, a track laying vehicle will have a left-hand and right-hand track which can be driven at the same speed for straight-line movement or one track driven slower relative to the other for steering or pivot turning of the vehicle.

Referring to FIG. 1, the prior art shows separate electric motors/mechanical transmission drive systems being used in a track laying vehicle, with one electric motor/mechanical transmission per track. By varying the speed/torque of each motor, the vehicle can be propelled in a straight line or steered. If a component in one drive breaks, only one track on the intact side can be driven to continue vehicle movement. In addition, steering becomes inefficient as the inside track must often be slowed down (power absorbed) to enable steering; either the inside track must have a brake to slow it sufficiently (very inefficient) or the inside track's motor becomes a generator (more efficient than a brake but losses occur turning mechanical power into electrical power, through the power control unit, then back into mechanical power at the outside track's motor).

An alternative drive device as provided by US 2005/0187067 and as shown in FIG. 2, is to use a gear assembly with one motor providing linear traction and a second motor providing steering overlaying power on the left- and right-hand outputs through a pair of summing planetary differentials. The advantage of this device is steering can be very efficient since power can be absorbed from the inside track and transferred to the outside track. However, the disadvantage is that a separate motor and gearing system is required for steering and the steering motor cannot be used for linear traction and the linear traction motor cannot be used for steering.

The invention presented here solves the problem of choosing between a system which has the added weight of a separate steering system versus a less efficient system which uses a dual independent motor drive.

Other objects of the invention will be apparent from the description that follows.

SUMMARY OF THE INVENTION

According to the present invention there is provided an electro-mechanical cross-steer device for a vehicle. The device may include a first and a second motor and first and second output planetary gear set, each having a transfer gear assembly mechanically connected to the first and second motors, respectively. Additionally, a differential may be included which is mechanically connected to the first and second output planetary gear sets via a mainshaft connected to the first and second output planetary gear sets. First and second input shafts may be mechanically connected to the first and second transfer gear assemblies and to the differential. First and second output shafts may be respectively connected to the first and second output planetary gear sets with each of the output shafts operable to drive a particular side of a vehicle. When conditioning speeds of the first and second motors to equal values, speed ratios between the first and second output shafts may be 1:1 and the vehicle may move in a straight line. When conditioning the speeds of the first and second motors to unequal values, the speed ratios between the first and second output shafts may not be 1:1 and braking energy from an output shaft may be transferred to the other output shaft thereby allowing steering of the vehicle without braking energy being dissipated as heat.

According to the present invention, there is also provided a method for electro-mechanically cross-steering a vehicle. The method may provide a first and a second motor and first and second output planetary gear set, each having a transfer gear assembly mechanically connected to the first and second motors, respectively. Additionally, a differential may be provided which is mechanically connected to the first and second output planetary gear sets via a mainshaft connected to the first and second output planetary gear sets. First and second input shafts may be provided that are mechanically connected to the first and second transfer gear assemblies and to the differential. First and second output shafts may be respectively provided and connected to the first and second output planetary gear sets with each of the output shafts operable to drive a particular side of a vehicle. When conditioning speeds of the first and second motors to equal values, speed ratios between the first and second output shafts may be 1:1 and the vehicle may move in a straight line. When conditioning the speeds of the first and second motors to unequal values, the speed ratios between the first and second output shafts may not be 1:1 and braking energy from an output shaft may be transferred to the other output shaft thereby allowing steering of the vehicle without braking energy being dissipated as heat.

Other aspects of the invention will be appreciated by reference to the detailed description of the preferred embodiment and to the claims that follow.

BRIEF DESCRIPTION OF THE DRAWINGS

The preferred embodiment of the invention will be described by reference to the drawings thereof in which.

DESCRIPTION OF THE PREFERRED EMBODIMENT OF THE INVENTION

| # | Name |
|---|---|
| | Table of Components |
| 1 | DRIVE DEVICE |
| 2 | LH MOTOR |
| 3 | RH MOTOR |
| 4 | LH OUTPUT SHAFT |
| 5 | RH OUTPUT SHAFT |
| 6 | ELECTRICAL POWER CONNECTOR |
| 7 | ELECTRICAL POWER CONNECTOR |
| 9 | FIRST BRAKE |
| 10 | SECOND BRAKE |
| 11 | CLUTCH |
| 12 | MAINSHAFT |
| 19 | DRIVE HOUSING (full housing not shown) |
| 20 | LH TRANSFER GEAR ASSEMBLY |
| 30 | RH TRANSFER GEAR ASSEMBLY |
| 40 | LH OUTPUT PLANETARY |
| 50 | RH OUTPUT PLANETARY |
| 60 | $2^{nd}$ RANGE GEARSET |
| 80 | LH/RH MOTOR COUPLING CLUTCH |
| 100 | CENTER DIFFERENTIAL |
| 101 | LH INPUT SHAFT |
| 102 | RH INPUT SHAFT |
| 103 | CENTER DIFFERENTIAL OUTPUT SHAFT |
| 105 | LH SUN GEAR |
| 106 | RH SUN GEAR |
| 107 | CARRIER |
| 109a, b . . . | LH COMPOUND PLANET GEAR |
| 110a, b . . . | RH COMPOUND PLANET GEAR |
| 170 | DIFFERENTIAL BRAKE |

Figure 1:
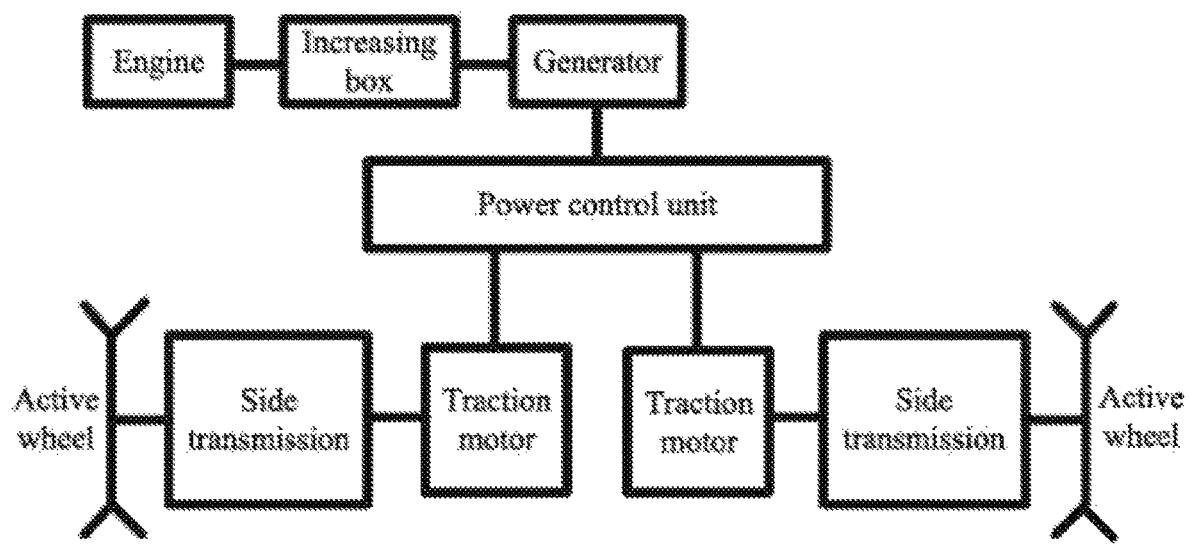
FIG. 1 is PRIOR ART schematic of 2 separate electric motors/mechanical transmission drive systems.
Figure 2:
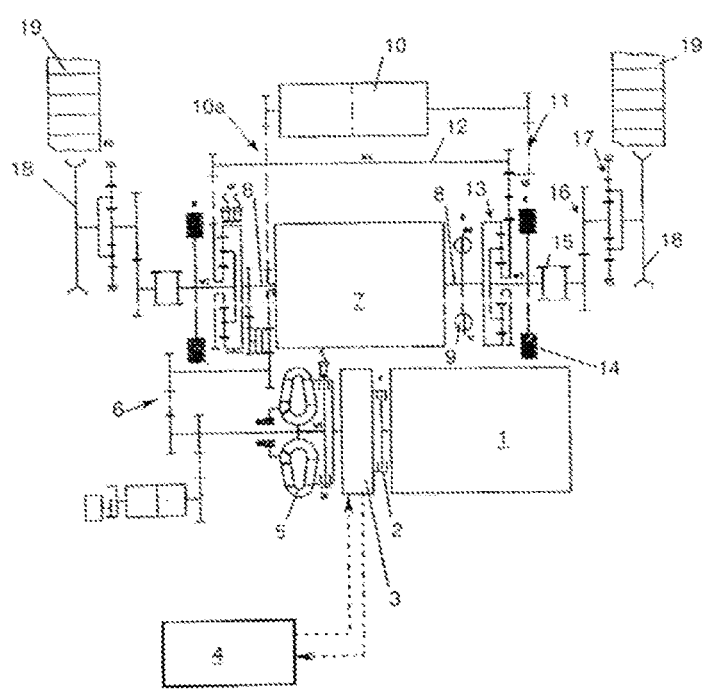
FIG. 2 is PRIOR ART schematic of an alternative gear assembly with one motor providing linear traction and a second motor providing steering.
Figure 3:
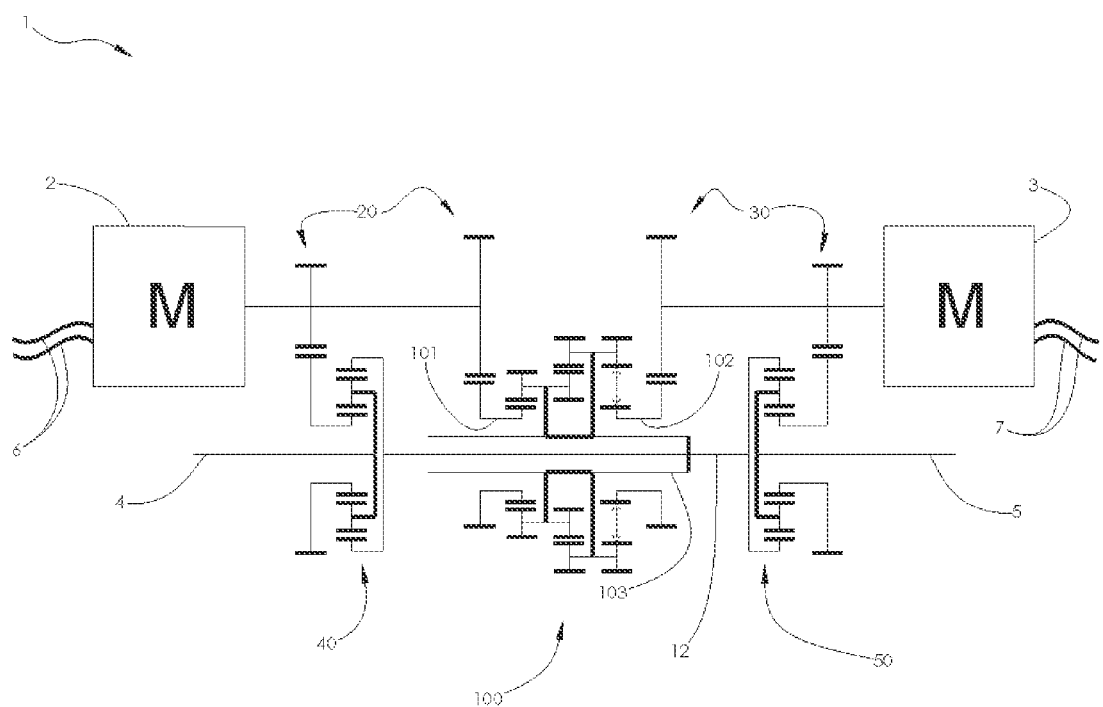
FIG. 3 is a schematic of a single mode electro-mechanical cross-steer drive device of the present invention.
Figure 4:
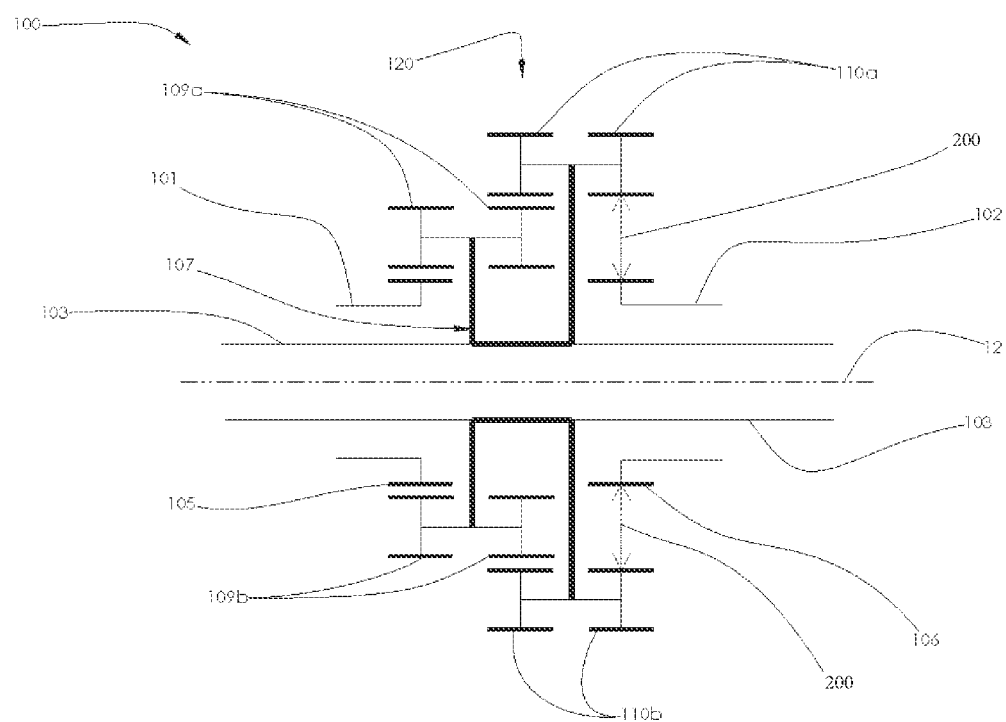
FIG. 4. is a schematic of a components of a center differential of FIG. 3.
Figure 5:
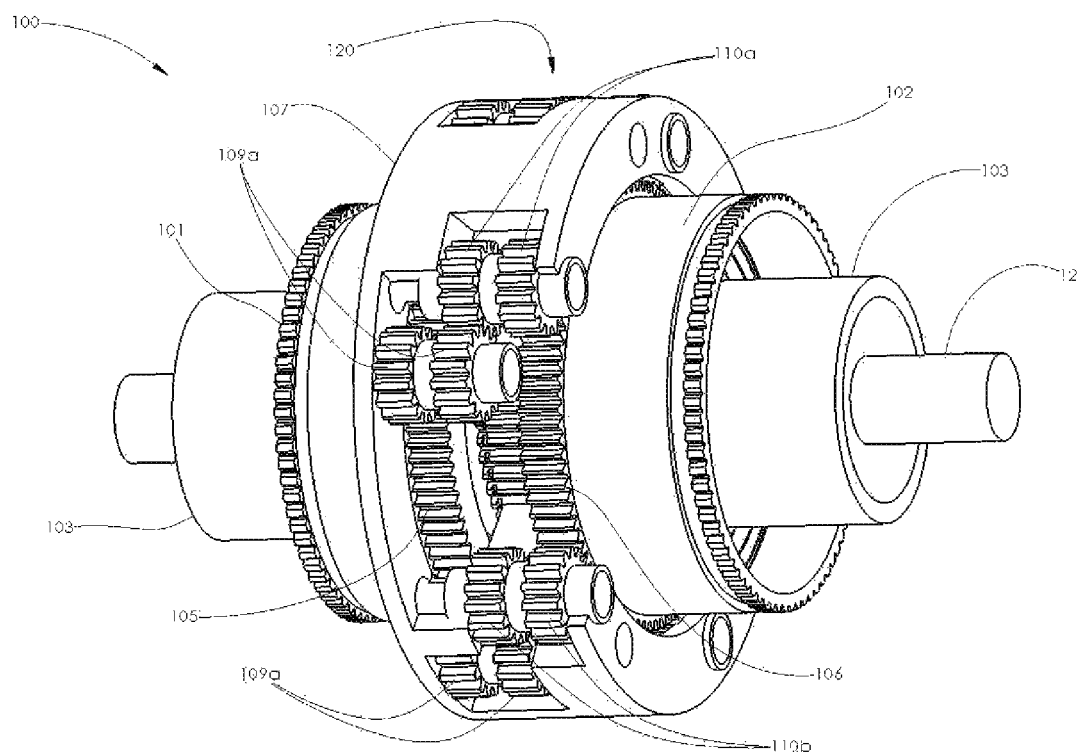
FIG. 5 is partial cross section of the center differential of FIG. 3.

Referring to FIGS. 3 to 5, the drive device 1 includes left hand (LH) 2 and right hand (RH) 3 motors, respectively. A center differential 100 is provided with a LH input shaft 101, a RH input shaft 102 and center differential output shaft 103. Additionally, LH transfer gear assembly 20 and RH transfer gear assembly 30 are also provided. Furthermore, LH output planetary gear set 40 and RH output planetary gear set 50 are provided with each gear set having at least 3 components. The device 1 also includes a mainshaft 12, LH output shaft 4 and RH output shaft 5. A housing 19 supports the above components.

Figure 6:
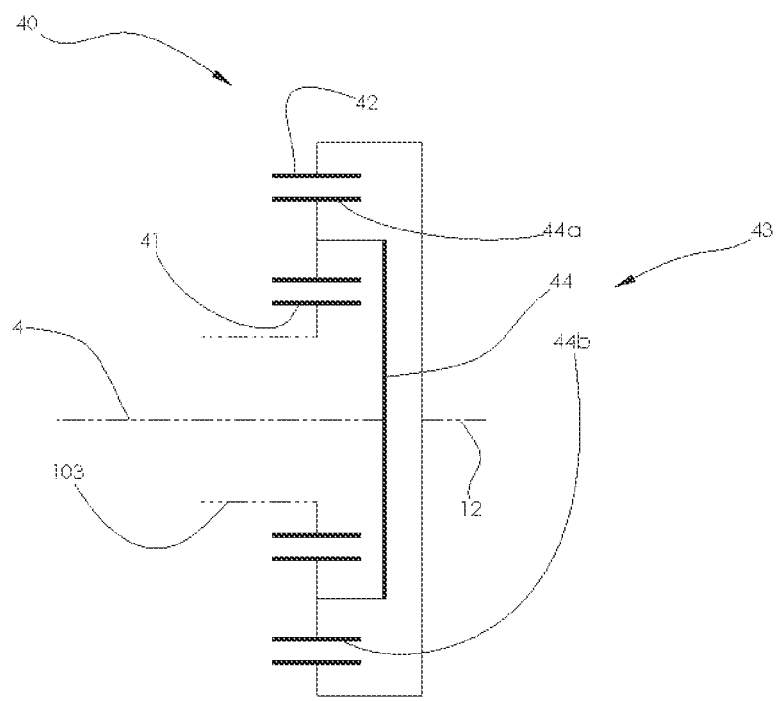
FIG. 6 is a schematic of a left hand (LH) output planetary of FIG. 3.
Figure 7:
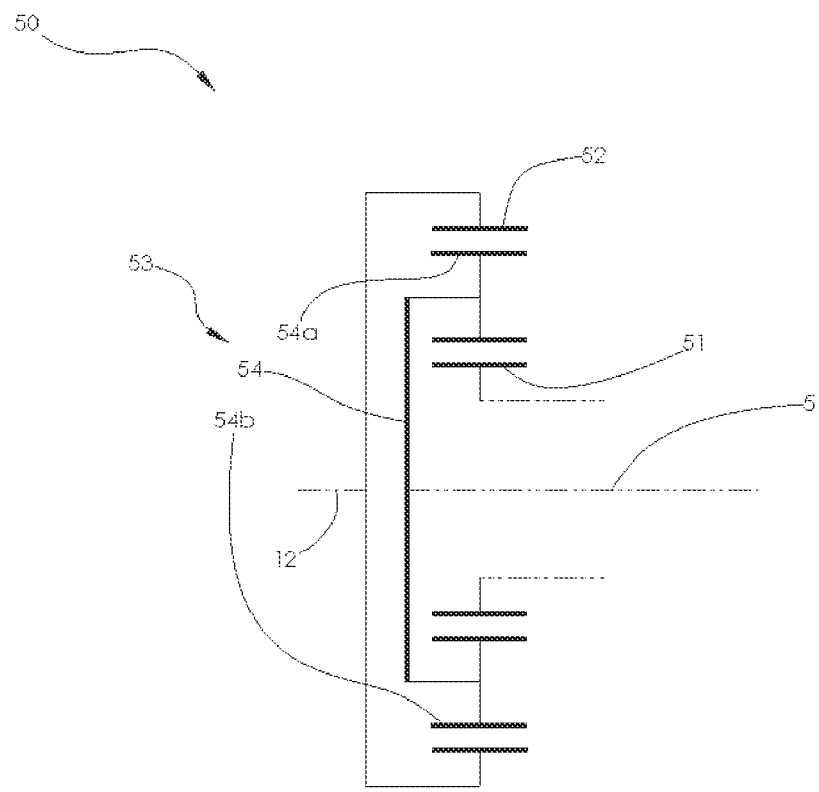
FIG. 7 is a schematic of a right hand (RH) output planetary of FIG. 3.

Additional details of LH and RH output planetary gear sets 40 and 50 are shown in FIGS. 6 and 7.

LH motor 2 is mechanically connected to a first component of the LH output planetary gear set 40 with LH transfer gear assembly 20. In the preferred embodiment, the first component of the LH output planetary gear set 40 is a sun gear 41. In a similar manner, RH motor 3 is mechanically connected to a first component of the RH output planetary gear set 50 with RH transfer gear assembly 30. In the preferred embodiment, the first component of the RH output planetary gear set 50 is a sun gear 51.

LH and RH motors 2 and 3 are also connected to the LH and RH input shafts 101 and 102 respectively of center differential 100 with LH and RH transfer gear assemblies 20 and 30.

The center differential 100 is connected to a second component of the LH output planetary gear set 40 with mainshaft 12 and to a second component of the RH output planetary gear set 50 also with mainshaft 12. In the preferred embodiment, the second components of the LH and RH output planetary gear sets 40 and 50 are ring gears 42 and 52 respectively.

A third component of the LH output planetary gear set 40 is connected to the LH output shaft 4. A third component of the RH output planetary gear set 50 is connected to the RH Output Shaft 5. In the preferred embodiment, the third components of the LH and RH output planetary gear sets 40 and 50 are carrier assemblies 43 and 53 respectively.

Figure 8:
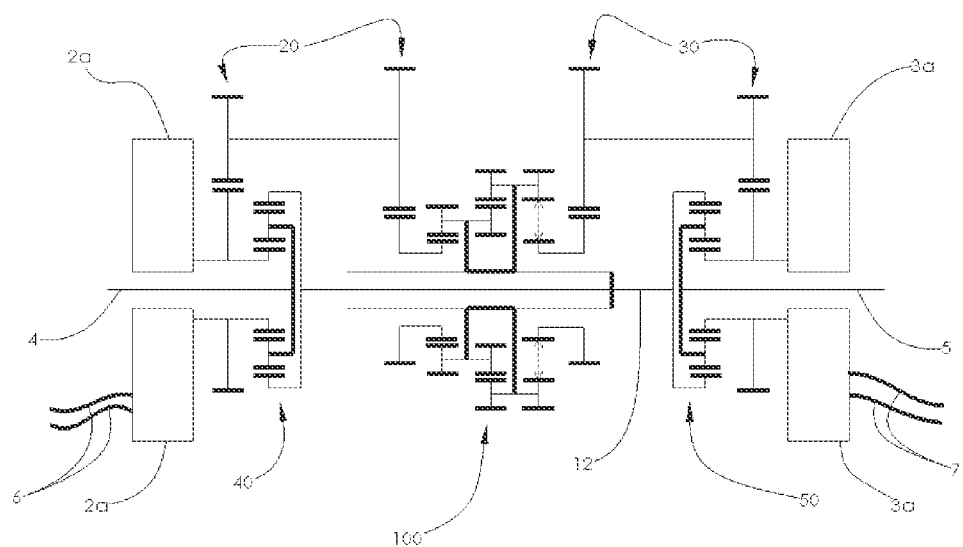
FIG. 8 is a schematic of a single mode/single range electro-mechanical cross-steer drive device with motors coaxial with output shafts of the present invention.

In an alternate embodiment shown in FIG. 8, the LH and RH 2a and 2b motors are located coaxially with the LH and RH output shafts 4 and 5 and are directly connected to the output planetary gear sets 40 and 50. The motors 2a and 2b of the alternate embodiment are constructed in a manner to allow the LH and RH output shafts 4 and 5 to pass freely through the rotational axes of the motors.

In yet another alternate embodiment (not shown) the first second and third components of the LH and RH output planetary gear sets 40 and 50 could be any of the suns, rings or carriers of the LH and RH Output Planetary Gear Sets 40 and 50.

By conditioning the speeds of the motors to equal values, the speed ratios between left hand and right-hand outputs of the drive unit are both 1:1 and the vehicle moves in a straight line; torques are adjusted as required to maintain straight line operation.

By conditioning the speeds of the motors to unequal values, steering capability is enabled; torques are adjusted and may be negative (braking) at one output while positive (driving) at the other output. The steering is said to be regenerative since braking energy is transferred from the braking side to the driving side rather than being dissipated as heat through a conventional brake-steer system.

The mode described here is known as Cross Steer Mode meaning that mechanical power from the LH and RH Motors 2 and 3 interact before arriving at the LH and RH output shafts 4 and 5.

In a further alternative embodiment, the LH and RH motors are variable displacement hydraulic motors accepting fluid pressure and flow from one or more hydraulic pumps and/or accumulators.

Referring back to FIGS. 6 and 7, the LH output planetary gear set 40 includes three components, a sun gear 41, a ring gear 42, and a carrier assembly 43. Carrier assembly 43 includes a carrier 44, a plurality of planet gears 44a, 44b, etc. mounted in the carrier assembly with each planet gear meshing with sun gear 41 and ring gear 42.

The LH output planetary gear set 40 has one component connected to the LH motor 2, a second component connected to the LH output shaft 4 and a third component connected to the mainshaft 12. The LH output planetary gear set 40 combines torque, speed and power from the LH motor 2 and the mainshaft 12 and transfers the combined torque, speed and power to the LH output shaft 4.

Likewise, the RH output planetary gear set 50 includes three components in an analogous arrangement to the LH output planetary gear set 40, a sun gear 51, a ring gear 52, and a carrier assembly 53. Carrier assembly 53 also includes a carrier 54, plurality of planet gears 54a, 54b, etc. mounted in the carrier assembly with each planet gear meshing with sun gear 51 and ring gear 52. The RH output planetary gear set 50 has one component connected to the RH motor 3, a second component connected to the RH output shaft 5 and a third component connected to the mainshaft 12. Analogous to the LH output planetary gear set 40, the RH output planetary gear set 50 combines torque, speed and power from the RH motor 3 and the mainshaft 12 and transfers the combined torque, speed and power to the RH output shaft 5.

As those skilled in the art will appreciate, the LH and RH output planetary gear sets 40 and 50 may also include are compound planetaries each with more than three components.

Referring back to FIGS. 4 and 5, the center differential 100 includes a planetary which includes at least three components, a LH sun gear 105, a RH sun gear 106, and a carrier assembly 120. Carrier assembly 120 includes a carrier 107, a plurality of LH compound planet gears 109a, 109b, etc. mounted in the carrier assembly with each planet gear meshing with LH sun gear 105. A plurality of RH compound planet gears 110a, 110b, etc. mounted in the carrier assembly 120 with each planet gear meshing (as shown in dotted line 200) with RH sun gear 106. The LH compound planet gears 109a, 109b, etc. mesh with the corresponding RH compound planet gears 110a, 110b, etc.

The center differential 100 has one component connected to the LH motor 2, a second component connected to the RH motor 3 and a third component connected to at least one output shaft. In the preferred embodiment, the center differential 100 has the LH sun gear 105 connected to the LH motor 2, the RH sun gear 106 connected to the RH motor 3 and the carrier assembly 120 connected to center differential output shaft 103.

The speed of center differential output shaft 103 is the average of the LH and RH input shafts 101 and 102. When both inputs to the center differential 100 are turning at the same speed the output(s) from the center differential turns at that speed. When one input to the center differential 100 turns slower than the other input, the output(s) from the center differential turns at the average of the two input speeds. When one input to the center differential 100 turns at the same but opposite speed as the other input, the output(s) from the center differential do not turn.

The function of the center differential 100 is similar to a differential in a passenger car i.e. to balance the torque between LH and RH output shafts and while allowing a speed differential between LH and RH output shafts when required such as making a turn. As utilized in this invention and installed in a tracked vehicle (such as used in construction equipment or in a military tank), the center differential 100 works in concert with LH and RH output planetary gear sets and separate LH and RH motors and, to introduce steering into the vehicle motion. With respect to the three speed input cases above for the center differential 100:

1. The LH and RH output planetary gear sets and both see the same input speeds from the motors and and the center differential:
   → LH and RH outputs 104 and 105 turn at the same speed and the vehicle moves in a straight line.
2. The LH and RH Output Planetary Gear Sets see different input speeds from the motors and the center differential:
   → LH and RH outputs 104 and 105 turn at different speeds and the vehicle moves in an circular path (i.e. turns).
3. The LH and RH Output Planetary Gear Sets both see the same but opposite input speeds from the motors and zero speed from the center differential:
   → LH and RH outputs 104 and 105 turn at the same but opposite speeds and the vehicle pivots about its center.

Figure 9:
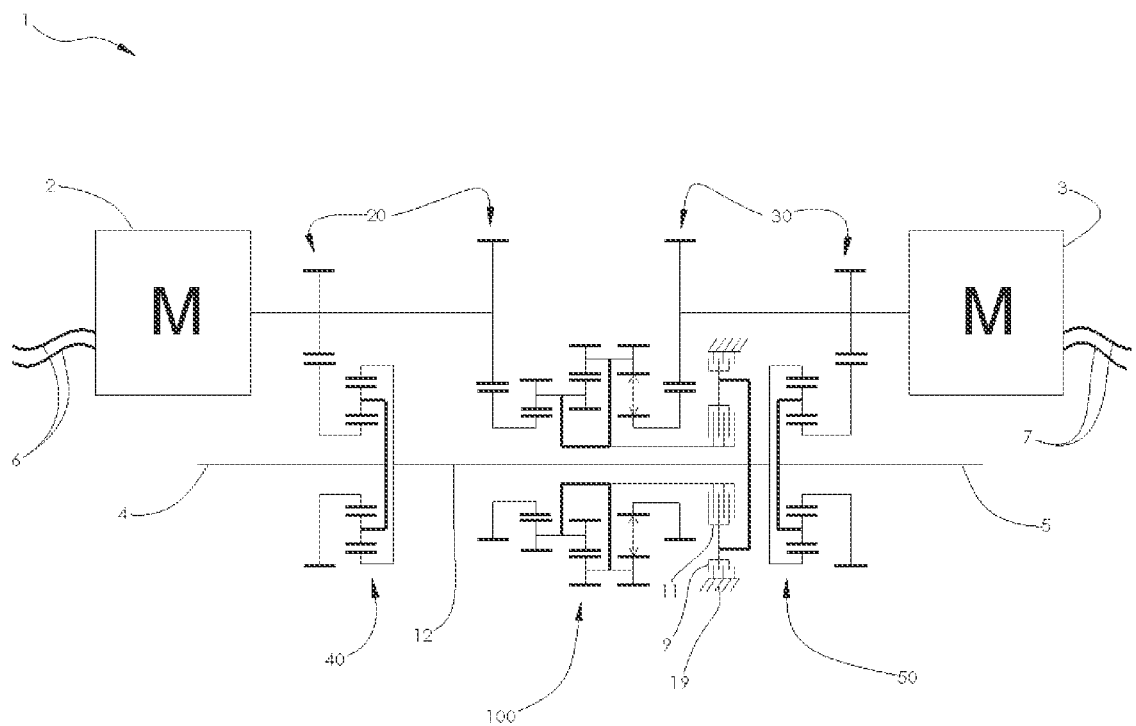
FIG. 9 is a schematic of a dual mode/two range electro-mechanical cross-steer drive device of the present invention.

Referring to FIG. 9, clutch 11 is introduced between the center differential 100 and the mainshaft 12 and first brake 9 is introduced between the mainshaft 12 and the housing 19. With clutch 11 engaged and first brake 9 disengaged, the drive device 1 operates as described above.

By disengaging clutch 11 and engaging first brake 9 a second mode of operation is enabled and hence a second speed/torque range is also enabled. The mode described here is known as Direct Steer Mode. In this mode, center differential 100 is not active and mainshaft 12 with LH and RH ring gears 42 and 52 are prevented from turning. Power from the LH motor 2 only flows through the LH output planetary to the LH output shaft and likewise power from the RH Motor 3 only flows through the RH output planetary to the RH output shaft. Steering is enabled by adjusting the speed ratio between LH and RH motors 2 and 3 but mechanical regenerative steering is not enabled.

Figure 10:
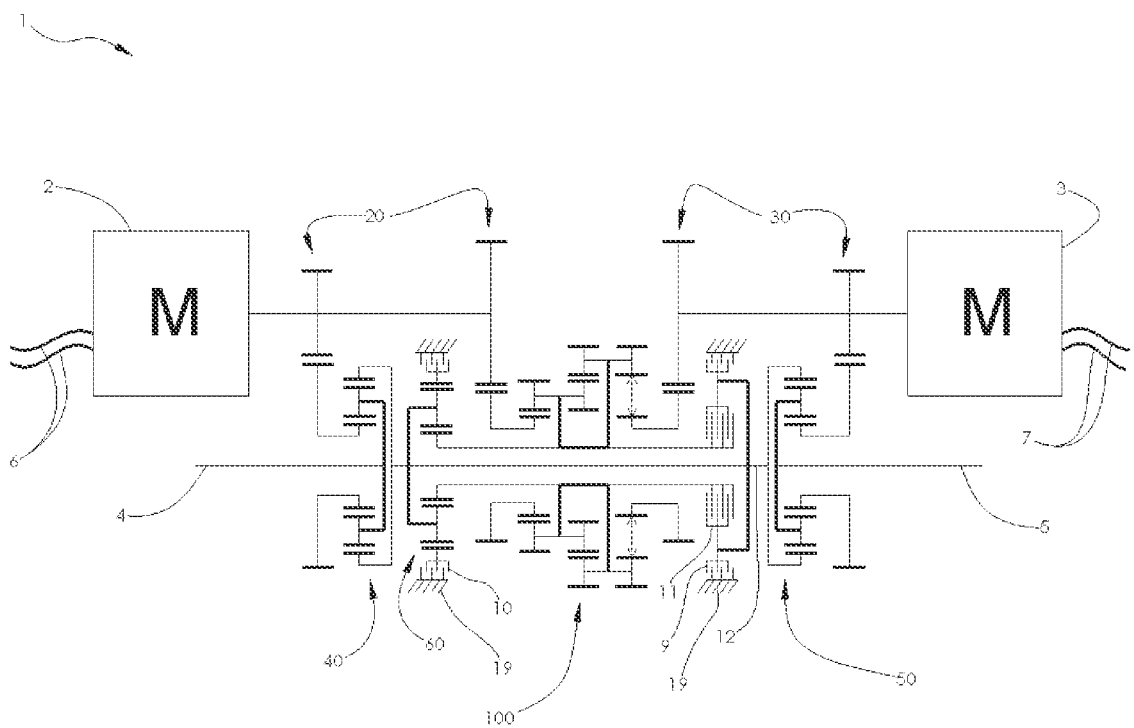
FIG. 10 is a schematic of a dual mode/three range electro-mechanical cross-steer drive device of the present invention.

Referring to FIG. 10, intermediate gearset 60 is introduced between the center differential output shaft 103 and mainshaft 12. In the preferred embodiment, intermediate gearset 60 is a planetary gearset with a first component connected to the center differential output shaft 103 and a second component connected to the mainshaft 12 and a third component. Second brake 10 is introduced between the third component of intermediate gearset 60 and the housing 19. With second brake 10 activated while first brake 9 and clutch 11 are deactivated, second brake 10 prevents the third component of intermediate gearset 60 from turning and enables a change in speed and torque between center differential output shaft 103 and mainshaft 12.

In the preferred embodiment, the first component of intermediate gearset 60 is a sun gear, the second component is a carrier assembly and the third component is a ring gear. As those skilled in the art will appreciate, any of the sun, ring or carrier assembly is any of the first, second or third components. As those skilled in the art will also appreciate, the intermediate gearset 60 may be a compound planetary with additional clutches and/or brakes capable of one or more speed ranges, or a spur gear set with a clutch to engage the gear set. One or more gearsets similar to intermediate gearset 60 may also be introduced between center differential output shaft 103 and mainshaft 12 along with means to individually engage each gearset to allow more than one speed/torque ratio change between center differential output shaft 103.

The following table illustrates which clutches/brakes must be applied to achieve any of the 3 drive device ranges of the embodiment shown in FIG. 10:

| RANGE | MODE | FIRST BRAKE 9 | SECOND BRAKE 10 | CLUTCH 11 |
|---|---|---|---|---|
| $1^{ST}$ | DIRECT STEER | ENGAGED | — | — |
| $2^{ND}$ | CROSS STEER | — | ENGAGED | — |
| $3^{RD}$ | CROSS STEER | — | — | ENGAGED |

As noted previously, more ranges are possible by adding additional gearsets between the center differential 100 and the mainshaft 12.

Figure 11:
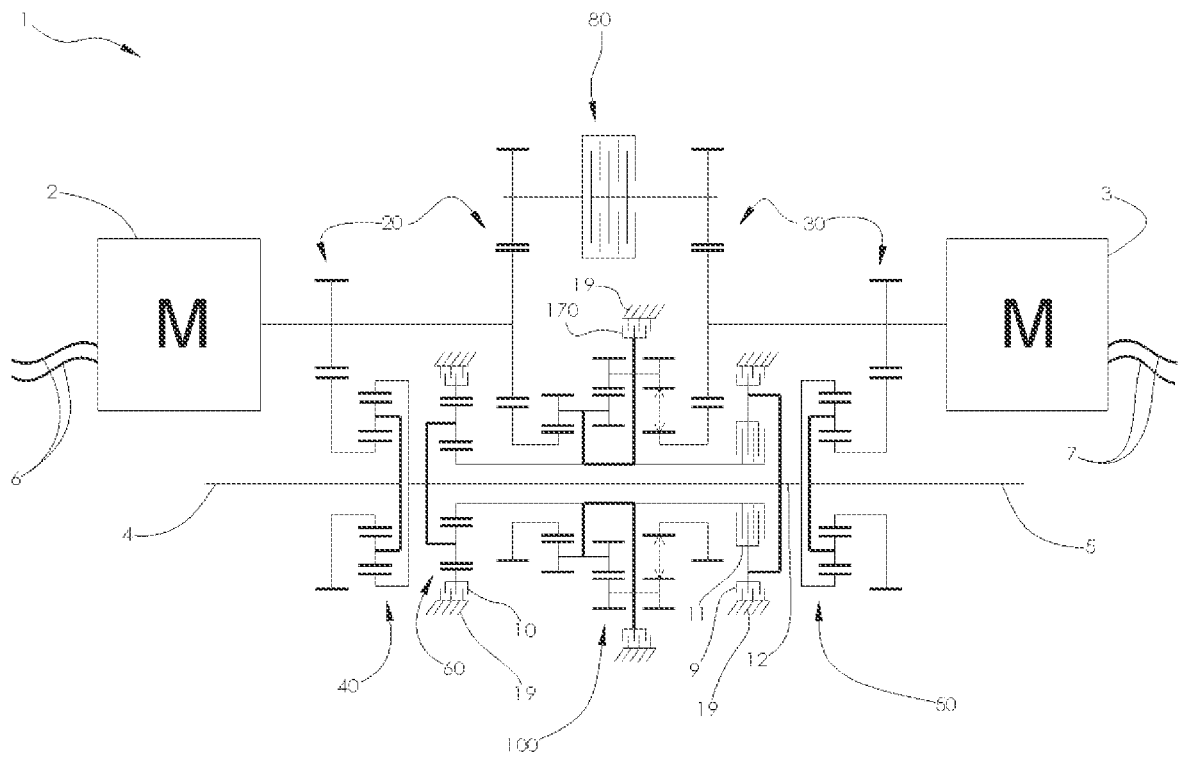
FIG. 11 is a schematic with a LH/RH motor coupling clutch and a differential brake added to the present invention.
Figure 12:
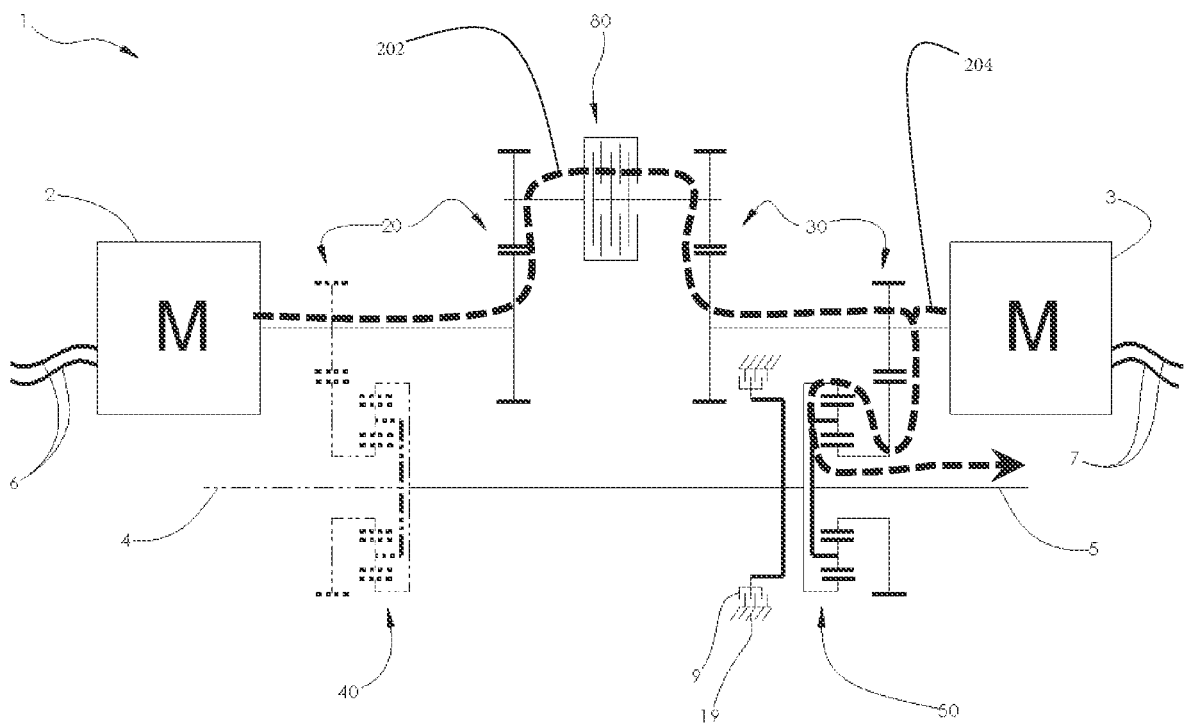
FIG. 12 is a schematic with LH/RH motor coupling clutch active of the present invention.

As shown in FIG. 11 the LH and RH motors 2 and 3 may be mechanically coupled together with LH/RH motor coupling clutch 80. In the event of the failure of a component directing power and torque to one side or the situation where the track or wheel has no traction (eg on ice), power and torque from both LH and RH motors may be directed to the side which is still operational and has traction. Further, in the event of one track being frozen, all power and torque may be directed to breaking that track loose. FIG. 12 illustrates the example of loss of traction on the LH side in $1^{st}$ range with the power flow from the LH Motor 2 to the coupling clutch 80 shown by slashed line 202 and the power flow from the RH Motor 3 to the coupling clutch 80 shown by slashed line 204. A similar example (not shown) applies to the RH side.

Referring back to FIG. 11, the center differential 100 may be mechanically prevented from rotating by connecting it to the drive housing 19 by engaging the differential brake 170 allowing for steering control while coasting using a single motor.

Figure 13:
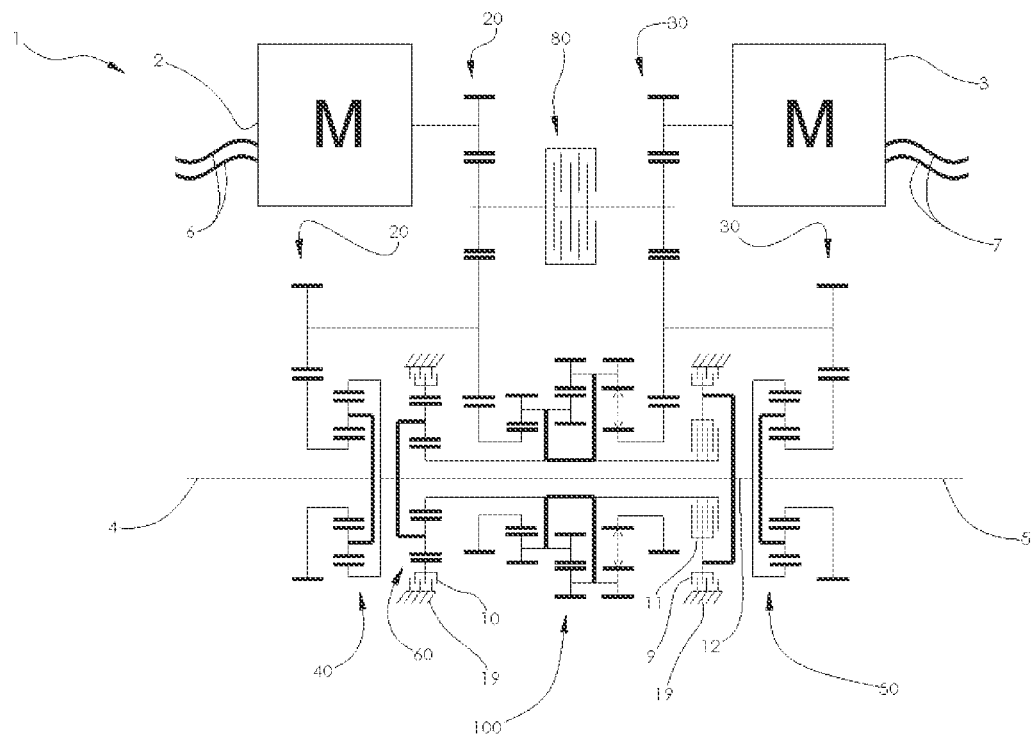
FIG. 13 is a schematic of the preferred embodiment of the present invention.

In a preferred embodiment of the invention as shown in FIG. 13, a Dual Mode/three Range Drive Device is depicted. Here, the drive device 1 can switch between two configurations or modes in conjunction with two geared ranges to attain three output speed ranges along with regenerative steering in two of the three ranges.

Figure 14:
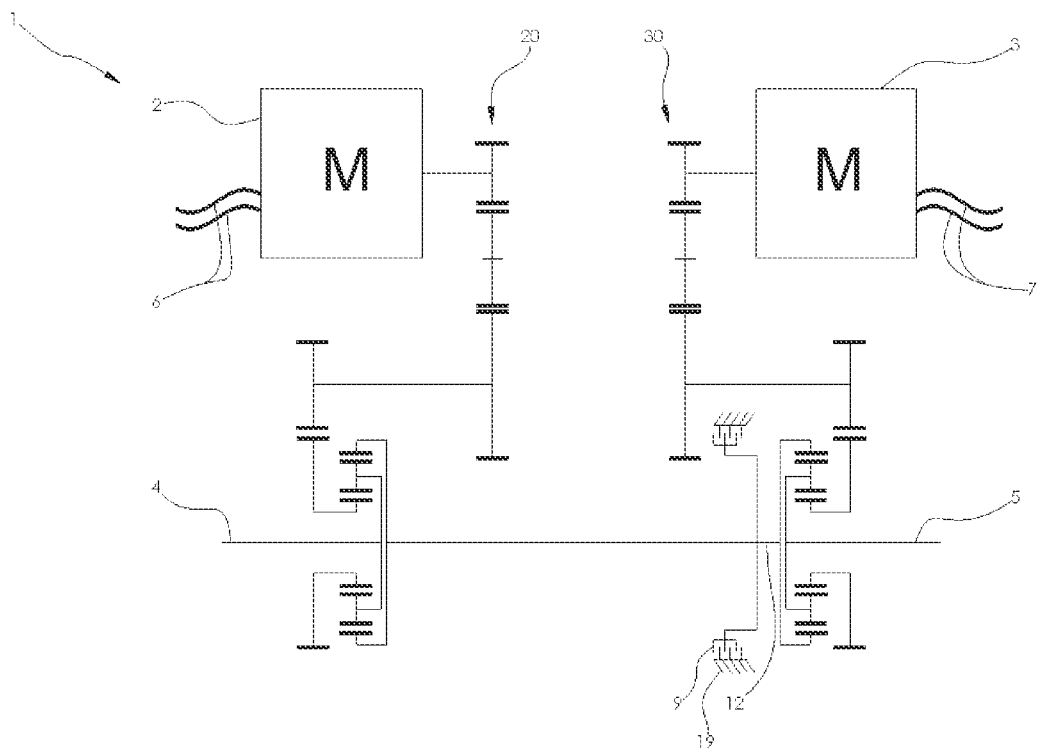
FIG. 14 is a schematic of $1^{st}$ range components driving/steering in the [referred embodiment of the present invention.
Figure 15:
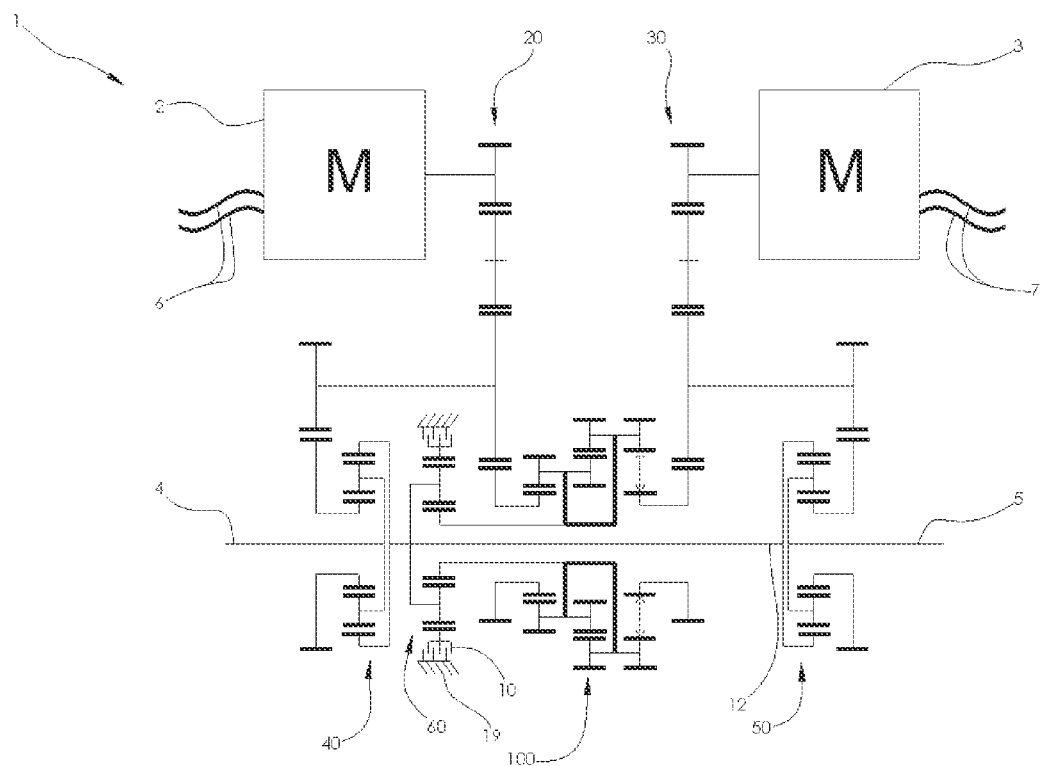
FIG. 15 is a schematic of $2^{nd}$ range components driving/steering in the preferred embodiment of the present invention.
Figure 16:
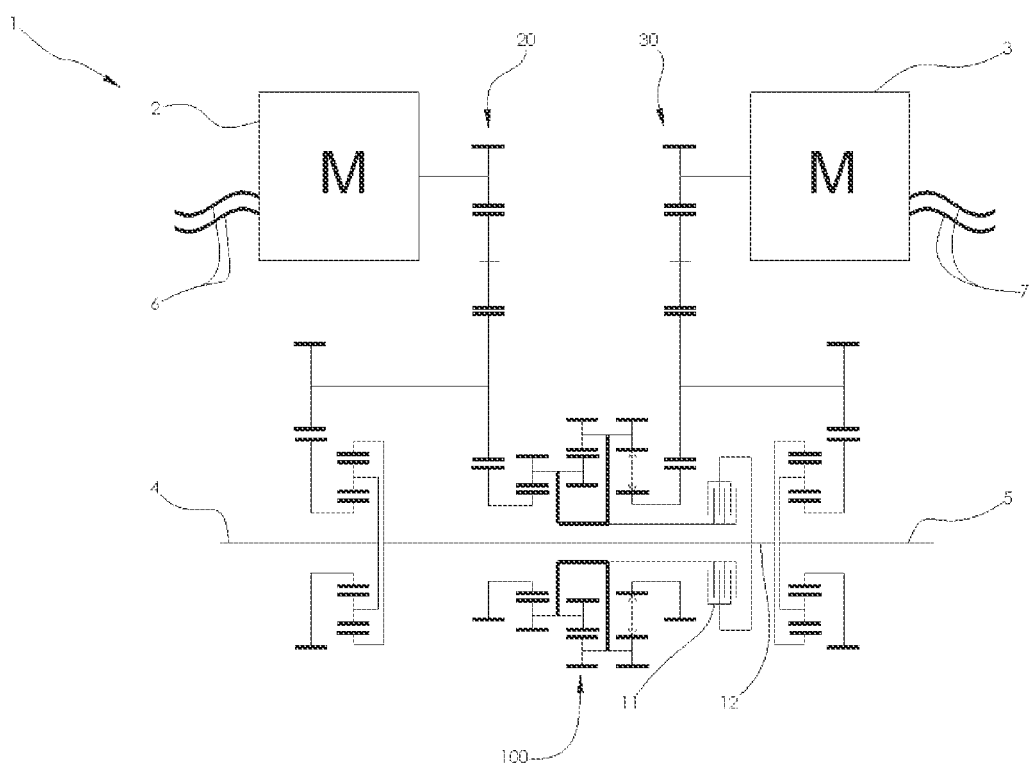
FIG. 16 is a schematic of $3^{rd}$ range components driving/steering in the preferred embodiment of the present invention.

The gear ratios of the gear sets are such that the following table qualitatively describes the torque and speed ratios in each range:

| RANGE | MODE | FIRST BRAKE 9 | SECOND BRAKE 10 | CLUTCH 11 | Torque Ratio | Speed Ratio | Loaded Elements |
|---|---|---|---|---|---|---|---|
| $1^{ST}$ | DIRECT STEER | ENGAGED | — | — | Greatest | Least | FIG. 14 |
| $2^{ND}$ | CROSS STEER | — | ENGAGED | — | Medium | Medium | FIG. 15 |
| $3^{RD}$ | CROSS STEER | — | — | ENGAGED | Least | Greatest | FIG. 16 |

Torque Ratio is defined here as the combined torque at the LH and RH Output Shafts 4 and 5 divided by the combined torque provided by the LH and RH Motors 2 and 3.

Speed Ratio is defined here as the average speed at the LH and RH Output Shafts 4 and 5 divided by the average speed of the LH and RH Motors 2 and 3.

While embodiments of the invention have been described and illustrated, such embodiments should be considered illustrative of the invention only. The invention may include variants not described or illustrated herein in detail. Thus, the embodiments described and illustrated herein should not be considered to limit the invention as construed in accordance with the accompanying claims.

The invention is susceptible to many variations, including scaling for capacity, in so long as design and process parameters are maintained. Accordingly, the drawings and description of the preferred embodiments are to be regarded as illustrative in nature, and not as restrictive.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise. The term "plurality" means "two or more", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

This description of preferred embodiments is to be read in connection with the accompanying drawings, which are part of the entire written description of this invention. In the description, corresponding reference numbers are used throughout to identify the same or functionally similar elements. Relative terms such as "left", "right", "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Neither the Title (set forth at the beginning of the first page of the present application) nor the Abstract (set forth at the end of the present application) is to be taken as limiting in any way as the scope of the disclosed invention(s). The title of the present application and headings of sections provided in the present application are for convenience only and are not to be taken as limiting the disclosure in any way.

What is claimed is:

1. A cross-steer device for a vehicle, comprising:
a first planetary gear set (first PGS) drivably connected to a first side of the vehicle;
a second planetary gear set (second PGS) drivably connected to a second side of the vehicle;
a third planetary gear set (third PGS) drivably coupled to the first PGS and the second PGS via a mainshaft;
a first motor separately drivably connected to the first PGS and the third PGS to allow the first motor to individually drive the first side of the vehicle, via the first PGS, and the second side of the vehicle, via the third PGS and the second PGS;
a second motor separately drivably connected to the second PGS and the third PGS to allow the second motor to individually drive the second side of the vehicle, via the second PGS, and the first side of the vehicle, via the third PGS and the first PGS; and
a first transfer gear assembly for connecting the first PGS and the third PGS to the first motor via separate transfer gearsets of the second transfer gear assembly; and
a second transfer gear assembly for connecting the second PGS and the third PGS to the second motor via separate transfer gearsets of the second transfer gear assembly.

2. The cross-steer device of claim 1, wherein the third PGS defines a first planet gear, a second planet gear, and a carrier supporting the first and second planet gears, the first motor being drivably coupled to the carrier via the first planet gear, the second motor being drivably coupled to the carrier via the second planet gear, the first PGS and the second PGS being drivably coupled in common to the carrier via the mainshaft.

3. The cross-steer device of claim 2, wherein the third PGS is free of any ring gears.

4. The cross-steer device of claim 1, wherein the first PGS is drivably connected to the first side of the vehicle via a carrier of the first PGS that is coupled to the mainshaft via a ring gear of the first PGS.

5. The cross-steer device of claim 4, wherein the second PGS is drivably connected to the second side of the vehicle via a carrier of the second PGS that is coupled to the mainshaft via a ring gear of the second PGS.

6. The cross-steer device of claim 1, further comprising a clutch disposed between the third PGS and the mainshaft to allow selective engagement of the third PGS to the mainshaft;
a brake operably coupled to the mainshaft to allow selective arresting of rotation of the mainshaft to prevent driving of the mainshaft by the first PGS and the second PGS when the clutch disengages the third PGS from the mainshaft.

7. The cross-steer device of claim 6, further comprising:
a coupling clutch, the first motor and the second motor mechanically coupled to each other via the coupling clutch separately from the third PGS such that engagement of the first motor to the second motor via the coupling clutch allows power flow from the first motor to the second motor separately from the third PGS.

8. The cross-steer device of claim 6, wherein the third PGS is coupled to the mainshaft via a carrier of the third PGS, the cross-steer device further comprising:
a differential brake operably coupled to the carrier of the third PGS to allow selective arresting of rotation of the carrier of the third PGS.

9. A vehicle comprising the cross-steer device of claim 1.

10. A method of cross-steering a vehicle, comprising:
providing a first planetary gear set (first PGS) drivably connected to a first output shaft, the first output shaft operable to drive a first side of the vehicle;
providing a second planetary gear set (second PGS) drivably connected to a second output shaft, the second output shaft operable to drive a second side of the vehicle;
providing a third planetary gear set (PGS) drivably coupled to the first PGS and the second PGS via a mainshaft;
providing a first motor separately drivably connected to the first PGS and the third PGS to allow the first motor to individually drive the first side of the vehicle, via the first PGS, and the second side of the vehicle, via the third PGS and the second PGS; and
providing a second motor separately drivably connected to the second PGS and the third PGS to allow the second motor to individually drive the second side of the vehicle, via the second PGS, and the first side of the vehicle, via the third PGS and the first PGS,
wherein the first PGS and the third PGS are connected to the first motor via separate transfer gearsets of a first transfer gear assembly, and the second PGS and the third PGS are connected to the second motor via separate transfer gearsets of a second transfer gear assembly,
wherein conditioning speeds of said first and second motors to equal values, speed ratios between first and second output shafts are 1:1 and the vehicle moves in a straight line, and conditioning said speeds of said first and second motors to unequal values, said speed ratios between first and second output shafts is not 1:1 and braking energy is transferred between the first and second output shafts to thereby allow steering of the vehicle without braking energy being dissipated as heat.

* * * * *

UNITED STATES PATENT AND TRADEMARK OFFICE
CERTIFICATE OF CORRECTION

| | |
|---|---|
| PATENT NO. | : 12,024,027 B2 |
| APPLICATION NO. | : 18/017909 |
| DATED | : July 2, 2024 |
| INVENTOR(S) | : Wright et al. |

It is certified that error appears in the above-identified patent and that said Letters Patent is hereby corrected as shown below:

In the Claims

Column 9, Line 44, (Claim 1, Line 20), change "second" to --first--.

Signed and Sealed this
Fifth Day of November, 2024

Katherine Kelly Vidal
*Director of the United States Patent and Trademark Office*